O. J. McCURLEY.
AXLE NUT LOCK.
APPLICATION FILED FEB. 13, 1915.
1,268,985.
Patented June 11, 1918.
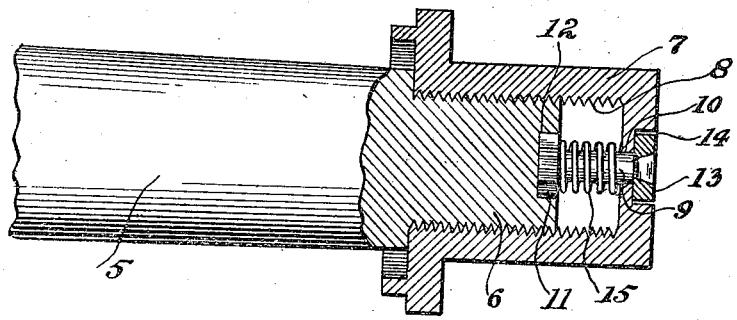
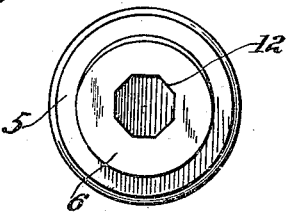
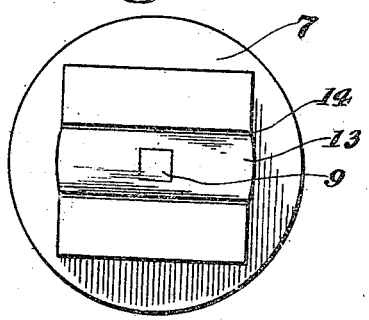
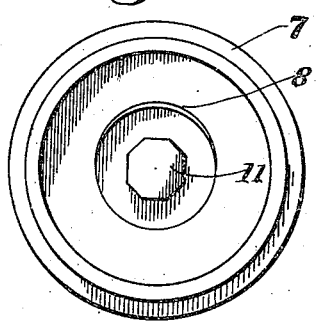
Witnesses
Inventor
O. J. McCurley.
By Victor J. Evans
Attorney

UNITED STATES PATENT OFFICE.

OREL J. McCURLEY, OF KISSIMMEE, FLORIDA.

AXLE-NUT LOCK.

1,268,985.  Specification of Letters Patent.  Patented June 11, 1918.

Application filed February 13, 1915. Serial No. 8,112.

*To all whom it may concern:*

Be it known that I, OREL J. McCURLEY, a citizen of the United States, residing at Kissimmee, in the county of Osceola and State of Florida, have invented new and useful Improvements in Axle-Nut Locks, of which the following is a specification.

The invention relates to an axle nut, and more particularly to the class of vehicle axle nut locks.

The primary object of the invention is the provision of a nut lock wherein the nut will be securely fastened on a vehicle axle so that the vehicle wheel will be prevented from coming loose from the axle, yet the said nut can be readily and quickly removed for detaching the wheel from the axle should the occasion require.

Another object of the invention is the provision of a nut lock of this character wherein the construction thereof is of novel form so as to allow the nut to be threaded home on the axle or removed therefrom.

A further object of the invention is the provision of a nut lock of this character which is extremely simple in construction, reliable and efficient in its purpose, readily and easily locked and unlocked as the occasion may require, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawing:—

Figure 1 is a fragmentary side elevation partly in section of an axle showing a nut lock constructed in accordance with the invention applied thereto.

Fig. 2 is an end elevation of the nut.

Fig. 3 is a view similar to Fig. 2 looking into the bore of the nut.

Fig. 4 is an end elevation of the axle.

Similar reference characters indicate corresponding parts throughout the several views in the drawing.

Referring to the drawing in detail, 5 designates a vehicle axle spindle having the reduced threaded end 6, while 7 is the nut having the internal threads 8 to permit the detachable connection of the same upon the externally threaded end 6 of the spindle as usual, both the nut and spindle being of any ordinary well-known type as they form no material part of the present invention with the exceptions hereinafter fully described.

The nut lock comprises a slide pin or stem 9 which fits within a correspondingly shaped opening 10 formed centrally in the closed end of the nut 7 and has formed at its inner end an octagonal shaped head 11 which is adapted for detachable engagement in a correspondingly shaped recess 12 formed in the reduced externally threaded end 6 of the spindle 5, while formed on or fixed to the outer end of the pin or stem 9 is a cross locking piece 13 which is adapted to enter and be seated within a correspondingly shaped groove 14 formed in the outer closed end of the nut in its outer face transversely thereof, and when this piece 13 is seated in the groove the head 11 is engaged in the recess 12 on the application of the nut 7 upon the threaded end 6 of the spindle, thereby locking the nut fast thereto.

Surrounding the pin or stem 9 is a coiled expansion spring 15, one end of which plays against the head 11, while its opposite end plays against the inner face of the closed end of the nut 7, and this spring is designed to force the head 11 into the recess 12 when the cross piece 13 registers with the groove 14 so that the nut 7 will be locked on the spindle and also the nut lock will be made fast for securely holding such nut thereon.

When the cross piece 13 is engaged in the groove 14 the outer surface thereof is flush with the outer surface of the closed end of the nut, thereby giving a neat appearance to the nut and with the ends of the cross-piece outwardly curved to extend beyond the ends of the groove 14 to form a finger hold when the cross-piece is operated to withdraw the head 11 from within the recess in the end of the axle against the influence of the spring 15.

From the foregoing description, taken in connection with the accompanying drawing, the construction of the device will be clearly understood, and therefore a more extended explanation has been omitted.

What is claimed is:—

In a device of the character described, in combination with an axle having an extension thereon, a nut threaded upon said extension and having a closed end provided with a transverse groove in its outer face, a stem extending through said closed end centrally of said groove, an angular member on the inner end of said stem engaging within a corresponding recess in the end of said axle extension, a spring surrounding said stem and abutting against said angular member and said closed end of the nut, and a cross-piece secured upon the outer end of said stem and seated within said groove, the ends of said cross-piece extending beyond the ends of said groove to afford finger grips.

In testimony whereof I affix my signature in presence of two witnesses.

OREL J. McCURLEY.

Witnesses:
J. M. COOPER,
D. B. CULMA.

Copies of this patent may be obtained for five cents each, by addressing the "Commissioner of Patents, Washington, D. C."